(12) United States Patent
Yamamoto et al.

(10) Patent No.: US 7,673,998 B2
(45) Date of Patent: Mar. 9, 2010

(54) ELECTRONIC APPARATUS AND ENCLOSURE ASSEMBLY THEREFOR

(75) Inventors: Atsuko Yamamoto, Kawasaki (JP);
Yoshiya Matsumoto, Kawasaki (JP);
Kazunori Murayama, Kawasaki (JP);
Hiroyuki Tanaka, Kawasaki (JP);
Hiroaki Sakashita, Kawasaki (JP);
Yoshifumi Kajiwara, Kawasaki (JP);
Takehisa Ishikawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 72 days.

(21) Appl. No.: 11/950,086

(22) Filed: Dec. 4, 2007

(65) Prior Publication Data
US 2008/0144307 A1 Jun. 19, 2008

(30) Foreign Application Priority Data
Dec. 15, 2006 (JP) ............................. 2006-338585

(51) Int. Cl.
*F21V 33/00* (2006.01)
*H04M 1/00* (2006.01)

(52) U.S. Cl. ................... 362/88; 455/575.1; 455/575.3; 340/815.4

(58) Field of Classification Search .................. 362/88, 362/24, 29, 30, 109, 551, 555; 455/575.1, 455/575.3; 340/815.4, 815.42, 815.45, 815.5
See application file for complete search history.

(56) References Cited

U.S. PATENT DOCUMENTS

| 6,254,249 | B1 | 7/2001 | Kim et al. |
| 7,092,626 | B2 * | 8/2006 | Hirai ........................... 396/176 |
| 2003/0203747 | A1 * | 10/2003 | Nagamine ................ 455/575.3 |
| 2006/0063570 | A1 * | 3/2006 | Nishimura ............... 455/575.3 |
| 2008/0076492 | A1 * | 3/2008 | Yamaguchi et al. ....... 455/575.3 |
| 2008/0132301 | A1 * | 6/2008 | Kim et al. ................. 455/575.3 |
| 2008/0146296 | A1 * | 6/2008 | Sakashita et al. .......... 455/575.3 |
| 2008/0176607 | A1 * | 7/2008 | Jin et al. ..................... 455/566 |

FOREIGN PATENT DOCUMENTS

| JP | 2000253125 A | 9/2000 |
| JP | 2006115108 A | 4/2006 |

* cited by examiner

*Primary Examiner*—Jacob Y Choi
(74) *Attorney, Agent, or Firm*—Westerman, Hattori, Daniels & Adrian, LLP

(57) ABSTRACT

An enclosure assembly allows a hinge bracket to realize establishment of the opened attitude or the closed attitude of a second enclosure relative to a first enclosure. The second enclosure rotates relative to the hinge bracket around the second rotation axis. The second enclosure in this manner changes its attitude relative to the first enclosure. The hinge bracket stays where it is. The hinge bracket does not rotate. The position of the light sources is thus kept unchanged. The position of the light is maintained regardless of a change in the attitude of the second enclosure around the second rotation axis. The enclosure for an electronic apparatus is thus allowed to enjoy an enhanced appearance. This leads to an enhanced appearance of the electronic apparatus.

14 Claims, 17 Drawing Sheets

ELECTRONIC APPARATUS AND ENCLOSURE ASSEMBLY THEREFOR

BACKGROUND OF THE INVENTION

1. Field of the Invention

The present invention relates to an electronic apparatus such as a cellular or mobile phone terminal. In particular, the present invention relates to an electronic apparatus including a hinge bracket coupled to a first enclosure for relative rotation around a first rotation axis parallel to the front surface of the first enclosure, the hinge bracket supporting a second enclosure for relative rotation around a second rotation axis extending within an imaginary plane perpendicular to the first rotation axis.

2. Description of the Prior Art

A cellular or mobile phone terminal of the clamshell type allows superposition of a display enclosure on the front surface of a main body enclosure. When the display enclosure rotates around a first rotation axis, the mobile phone terminal establishes the opened attitude. The screen of a display panel and keypads such as numeric keypads are exposed. The display enclosure is rotatable around a second rotation axis on a hinge bracket. The screen of the display panel can be changed over from a portrait state to a landscape state.

One is expected to consider impressive illumination for the mobile phone terminal. Light blinks in response to receipt of a call, in synchronization with music, and the like, for example. When a light source is incorporated in the display enclosure of the mobile phone terminal, the position of the emitted light moves when the display enclosure rotates. Impressive illumination thus cannot be realized as expected.

SUMMARY OF THE INVENTION

It is accordingly an object of the present invention to provide an electronic apparatus and an enclosure assembly therefor, enabling realization of impressive illumination.

According to a first aspect of the present invention, there is provided an enclosure assembly for an electronic apparatus, comprising: a first enclosure; a hinge bracket coupled to the first enclosure for relative rotation around a first rotation axis parallel to the front surface of the first enclosure; a second enclosure superposed on the surface of the hinge bracket, the second enclosure coupled to the hinge bracket for relative rotation around a second rotation axis extending within an imaginary plane perpendicular to the first rotation axis; a light source located on the hinge bracket; and a light diffusing member placed on the hinge bracket in front of the light source.

The enclosure assembly allows the hinge bracket to realize establishment of the opened attitude or the closed attitude of the second enclosure relative to the first enclosure. The second enclosure rotates relative to the hinge bracket around the second rotation axis. The second enclosure in this manner changes its attitude relative to the first enclosure. The hinge bracket stays where it is. The hinge bracket does not rotate. The position of the light sources is thus kept unchanged. The position of the light is maintained regardless of a change in the attitude of the second enclosure around the second rotation axis. The enclosure for an electronic apparatus is thus allowed to enjoy an enhanced appearance. This leads to an enhanced appearance of the electronic apparatus.

According to a second aspect of the present invention, there is provided an electronic apparatus comprising: a first enclosure; a hinge bracket coupled to the first enclosure for relative rotation around a first rotation axis parallel to the front surface of the first enclosure; a second enclosure superposed on the surface of the hinge bracket, the second enclosure coupled to the hinge bracket for relative rotation around a second rotation axis extending within an imaginary plane perpendicular to the first rotation axis; a light source located on the hinge bracket; and a light diffusing member placed on the hinge bracket in front of the light source. The position of the light is maintained regardless of a change in the attitude of the second enclosure around the second rotation axis in the electronic apparatus in the same manner as described above. The electronic apparatus is in this manner allowed to enjoy an enhanced appearance.

According to a third aspect of the present invention, there is provided an enclosure assembly for an electronic apparatus, comprising: a first enclosure; a hinge bracket coupled to the first enclosure for relative rotation around a first rotation axis parallel to the front surface of the first enclosure; a second enclosure having the back surface superposed on the front surface of the hinge bracket, the second enclosure coupled to the hinge bracket for relative rotation around a second rotation axis extending within an imaginary plane perpendicular to the first rotation axis; an optical path defined in the hinge bracket, the optical path extending from a first opening opposed to the back surface of the second enclosure to a second opening defined in a side wall standing upright from the back surface of the second enclosure; and a light source placed on the second enclosure at a position opposed to the first opening.

The enclosure assembly allows the hinge bracket to realize establishment of the opened attitude or the closed attitude of the second enclosure relative to the first enclosure in the same manner as described above. The second enclosure rotates relative to the hinge bracket around the second rotation axis. The second enclosure in this manner changes its attitude relative to the first enclosure. Here, the optical path extends from the first opening to the second opening. The light source is placed on the second enclosure at a position opposed to the first opening. The position of the light is maintained regardless of a change in the attitude of the second enclosure around the second rotation axis. The enclosure for an electronic apparatus is thus allowed to enjoy an enhanced appearance. This leads to an enhanced appearance of the electronic apparatus.

The enclosure assembly may further comprise a reflecting surface placed in the optical path to reflect light from the first opening to the second opening. The reflecting surface may be jagged. Light can be directed from the first opening to the second opening through the reflecting surface. The jagged surface of the reflecting surface allows the light to pass through the second opening over a wider range.

The enclosure assembly may further comprise a light diffusing member fixed to the second enclosure at a position on the optical path of the light source, the light diffusing member including stripes of swell on its surface. The stripes of swells serve to direct the light toward the hinge bracket over a wider range.

The enclosure assembly allows arrangement of the source elements of the light source on an imaginary circle concentric with the second rotation axis. A plurality of first openings may likewise be arranged on an imaginary circle concentric with the second rotation axis. The light sources may be arranged on the imaginary circle at constant intervals in the enclosure assembly. The first openings may likewise be arranged on the imaginary circle at constant intervals.

According to a fourth embodiment of the present invention, there is provided an electronic apparatus comprising: a first enclosure; a hinge bracket coupled to the first enclosure for relative rotation around a first rotation axis parallel to the front surface of the first enclosure; a second enclosure having the back surface superposed on the front surface of the hinge bracket, the second enclosure coupled to the hinge bracket for relative rotation around a second rotation axis extending within an imaginary plane perpendicular to the first rotation axis; an optical path defined in the hinge bracket, the optical path extending from a first opening opposed to the back surface of the second enclosure to a second opening defined in a side wall standing upright from the back surface of the second enclosure; and a light source placed on the second enclosure at a position opposed to the first opening. The electronic apparatus is thus allowed to enjoy an enhanced appearance.

BRIEF DESCRIPTION OF THE DRAWINGS

The above and other objects, features and advantages of the present invention will become apparent from the following description of the preferred embodiments in conjunction with the accompanying drawings, wherein.

DESCRIPTION OF THE PREFERRED EMBODIMENTS

Figure 1:
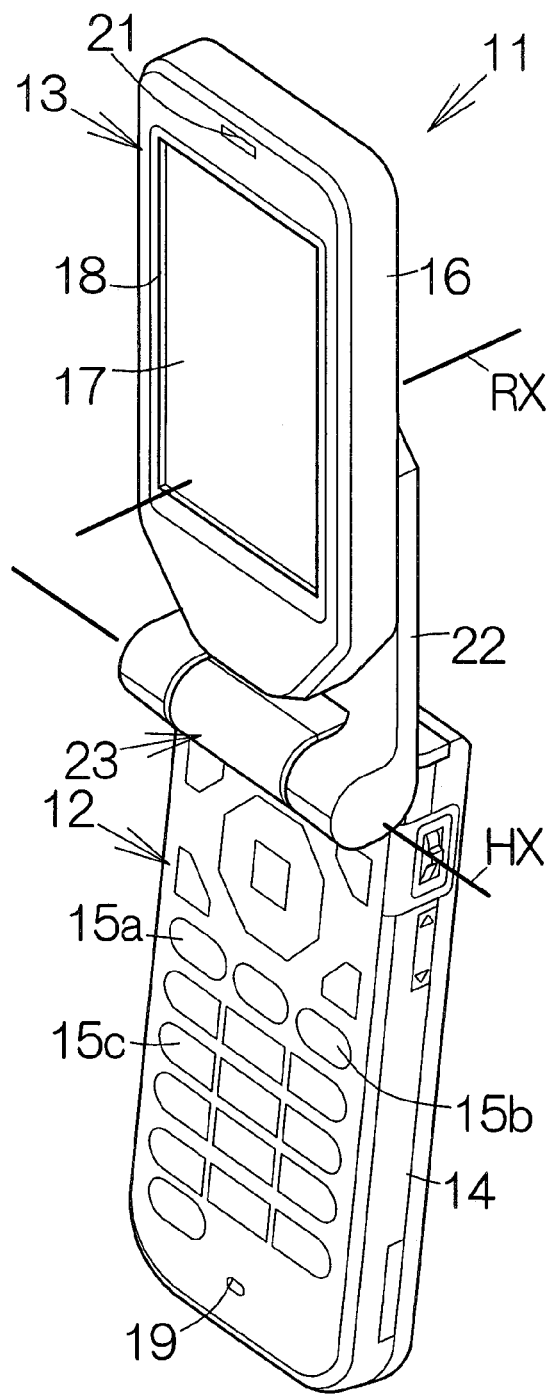
FIG. 1 is a perspective view schematically illustrating a cellular or mobile phone terminal as a specific example of an electronic apparatus according to the present invention.

FIG. 1 schematically illustrates a cellular or mobile phone terminal 11 of the clamshell type as an example of an electronic apparatus according to an embodiment of the present invention. The mobile phone terminal 11 includes a main apparatus 12 and a display unit 13. The main apparatus 12 includes a main body enclosure 14 serving as a first enclosure. A printed circuit board, not shown, is incorporated in the main body enclosure 14. Processing circuits, such as a central processing unit (CPU) and a memory, are mounted on the printed circuit board in a conventional manner. Keypads, such as an on-hook keypad 15a, an off-hook keypad 15b, numeric keypads 15c, and the like, are embedded in the flat front surface of the main apparatus 12. The CPU executes various processing in response to the manipulation of the keypads. The main body enclosure 14 may be molded from a reinforced resin material such as acrylonitrile butadiene styrene (ABS), for example.

The display unit 13 includes a display enclosure 16 serving as a second enclosure. A flat display panel module such as a liquid crystal display (LCD) panel module 17 is incorporated in the display enclosure 16. A window opening 18 is defined in the flat front surface of the display enclosure 16. The LCD panel module 17 defines a screen exposed in the window opening 18. Various texts and graphics are displayed on the screen of the LCD panel module 17 in response to the operation of the CPU. The display enclosure 16 may be molded from a reinforced resin material such as acrylonitrile butadiene styrene (ABS), for example.

A microphone hole 19 is defined in the flat front surface of the main body enclosure 14. A microphone is placed within the microphone hole 19. A speaker hole 21 is defined in the flat front surface of the display enclosure 16. A speaker is placed within the speaker hole 21. The user of the mobile phone terminal 11 speaks to the microphone during telephone conversation. The speaker reproduces the voice of the other party.

A hinge bracket 22 is coupled to the main body enclosure 14. A hinge 23 is utilized to couple the hinge bracket 22. The hinge 23 allows relative rotation around a first rotation axis HX between the main body enclosure 14 and the hinge bracket 22. The first rotation axis HX is designed to extend in parallel with the flat front surface of the main body enclosure 14.

The back surface of the display enclosure 16 is superposed on the front surface of the hinge bracket 22. The display enclosure 16 is coupled to the hinge bracket 22 for relative rotation around a second rotation axis RX. The second rotation axis RX is designed to extend within an imaginary plane perpendicular to the first rotation axis HX. The second rotation axis RX is also designed to intersect with the front surface of the hinge bracket 22. Here, the intersecting angle is set at 90 degrees between the second rotation axis RX and the front surface of the hinge bracket 22. The display enclosure 16 is in this manner allowed to rotate relative to the main body enclosure 14 around the first rotation axis HX.

When the mobile phone terminal 11 is set in an opened attitude, the main apparatus 12 and the display unit 13 face front. A portrait screen is established in the LCD panel module 17 while the main apparatus 12 is set in a vertical attitude. The user of the mobile phone terminal 11 is allowed to look at the keypads such as the numeric keypads 15c while he/she keeps looking at the portrait screen of the LCD panel module 17. The display enclosure 16 is rotatable around the first rotation axis HX. Such a rotation of the display enclosure 16 enables superposition of the display enclosure 16 on the flat front surface of the main body enclosure 14. The mobile phone terminal 11 thus takes a closed attitude. The mobile phone terminal 11 is set in a folded state in this manner.

Figure 2:
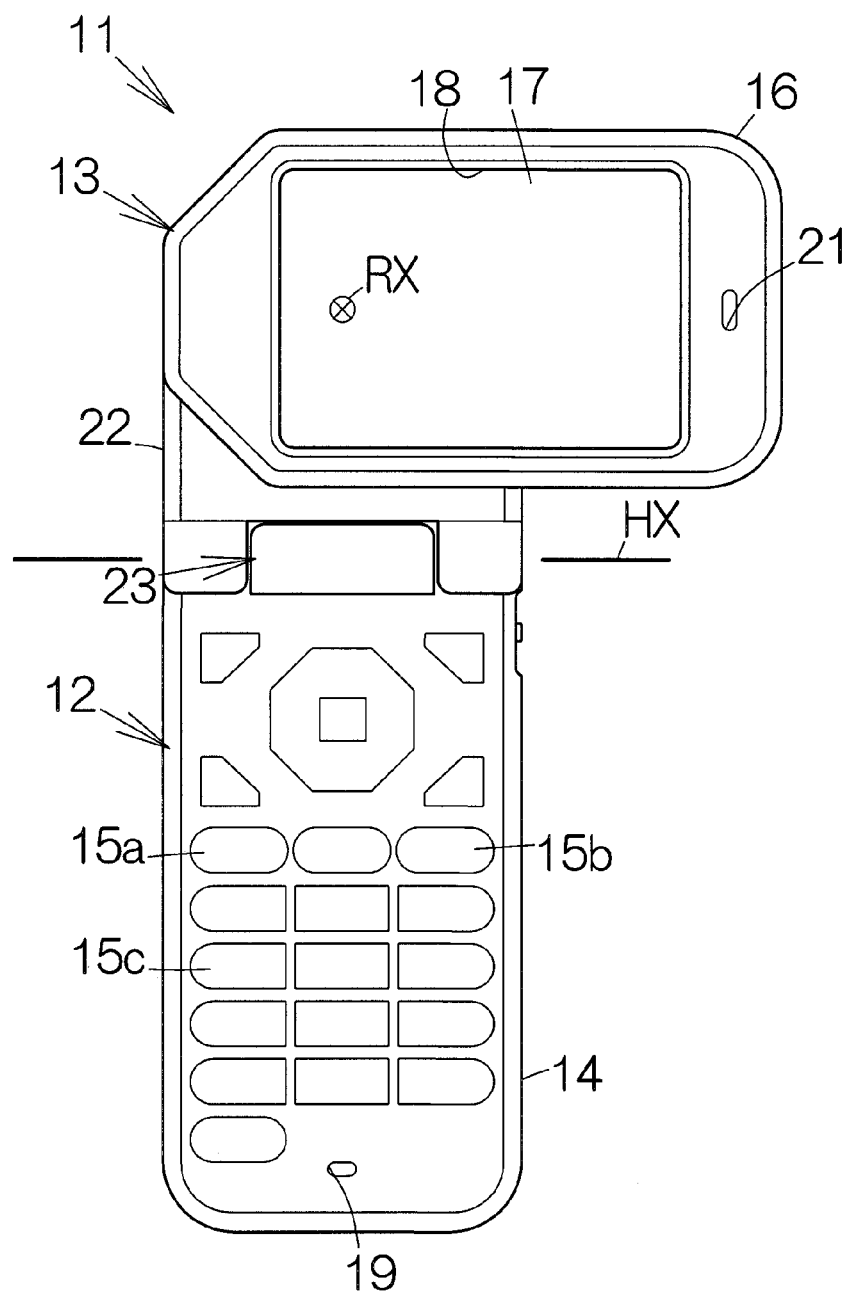
FIG. 2 is a front view schematically illustrating a first pivotal attitude of a display enclosure.
Figure 3:
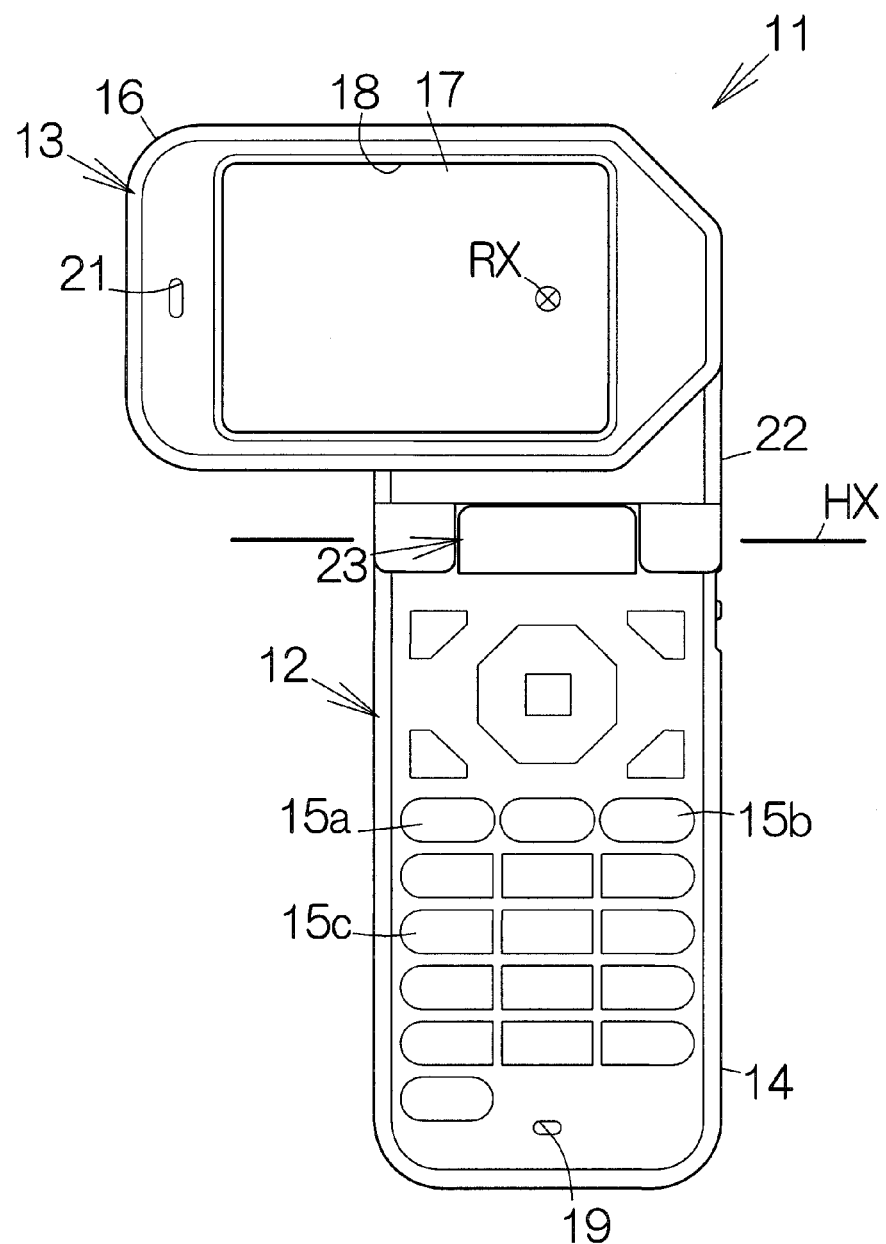
FIG. 3 is a front view schematically illustrating a second pivotal attitude of the display enclosure.

When the mobile phone terminal 11 takes the opened attitude, the display enclosure 16 is allowed to rotate around the second rotation axis RX, for example. When the display enclosure 16 rotates in the clockwise direction, namely a first direction, by the rotation angle of 90 degrees, from the upright attitude where the display panel module 17 provides the portrait screen, as shown in FIG. 2, the display enclosure 16 takes a first pivotal attitude. The landscape screen is established in the LCD panel module 17. When the display enclosure 16 rotates in the anticlockwise direction, namely a second direction, by the rotation angle of 90 degrees, from the upright attitude, the display enclosure 16 takes a second pivotal attitude, as shown in FIG. 3. The landscape screen is established in the LCD panel module 17.

Figure 4:
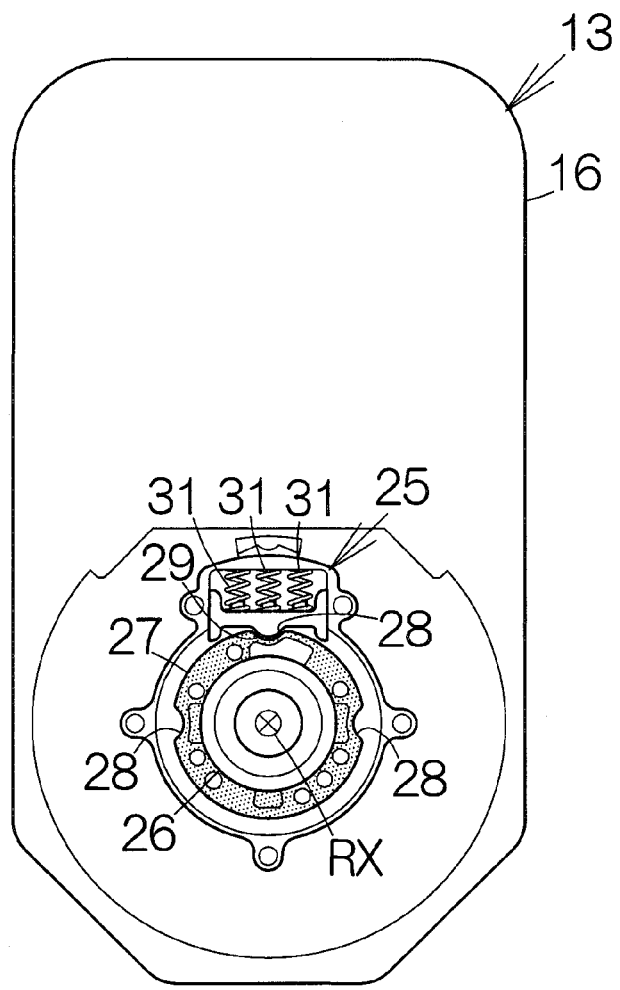
FIG. 4 is a backside view of the display enclosure.

As shown in FIG. 4, a swivel mechanism 25 is incorporated in the back surface of the display enclosure 16. The swivel mechanism 25 includes a hollow cylindrical shaft 26 having the central axis concentric with the second rotation axis RX. The hollow cylindrical shaft 26 is stationarily fixed to the display enclosure 16. A ring member 27 is mounted on the hollow cylindrical shaft 26 for relative rotation around the hollow cylindrical shaft 26. The ring member 27 is prevented from an axial movement relative to the hollow cylindrical shaft 26. Specifically, the ring member 27 is prevented from falling off. The hinge bracket 22 is fixed to the ring member 27. Relative rotation is restrained between the hinge bracket 22 and the ring member 27 around the hollow cylindrical shaft 26. Relative rotation between the hollow cylindrical shaft 26 and the ring member 27 thus enables relative rotation between the display enclosure 16 and the hinge bracket 22.

Three depressions 28 are formed on the outer edge of the ring member 27 at constant intervals of the central angle of 90 degrees. The depressions 28 are depressed toward the central axis of the hollow cylindrical shaft 26, namely the second rotation axis RX. The depressions 28 are respectively defined based on arched edges of the ring member 27, for example. An arched protrusion 29 is opposed to the outer edge of the ring member 27. Three springs 31 are utilized to urge the protrusion 29 toward the second rotation axis RX, for example. The protrusion 29 is received in one of the depressions 28. A combination of the protrusion 29 and the depressions 28 in this manner serves to restrain the relative rotation between the display enclosure 16 and the hinge bracket 22 at a desired position. The display enclosure 16 in this manner clicks on the hinge bracket 22 around the second rotation axis RX.

Figure 5:
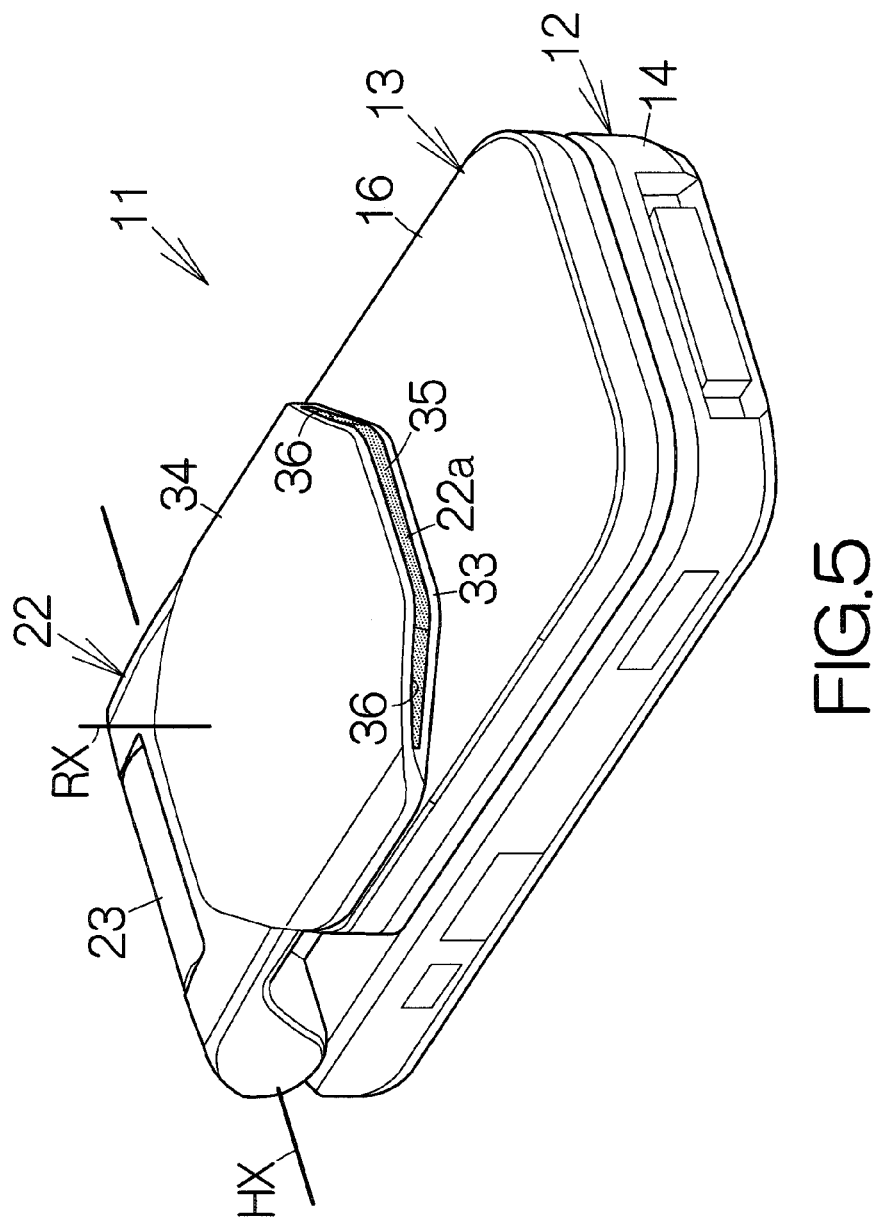
FIG. 5 is a perspective view schematically illustrating a hinge bracket.

As shown in FIG. 5, the hinge bracket 22 includes a bracket body 33. The bracket body 33 is superposed on the back surface of the display enclosure 16. The front surface of the bracket body 33 is coupled to the swivel mechanism 25. A bracket cover 34 covers over the back surface of the bracket body 33. The hinge bracket 22 has a side wall 22a standing in the direction perpendicular to the back surface of the display enclosure 16. A cover 35 is fitted in the side wall 22a. The cover 35 may be made of a semitransparent resin material, for example. The cover 35 allows transmission of light. The cover 35 thus accepts transmission of light. The cover 35 closes a pair of openings 36 defined in the side wall 22a.

Figure 6:
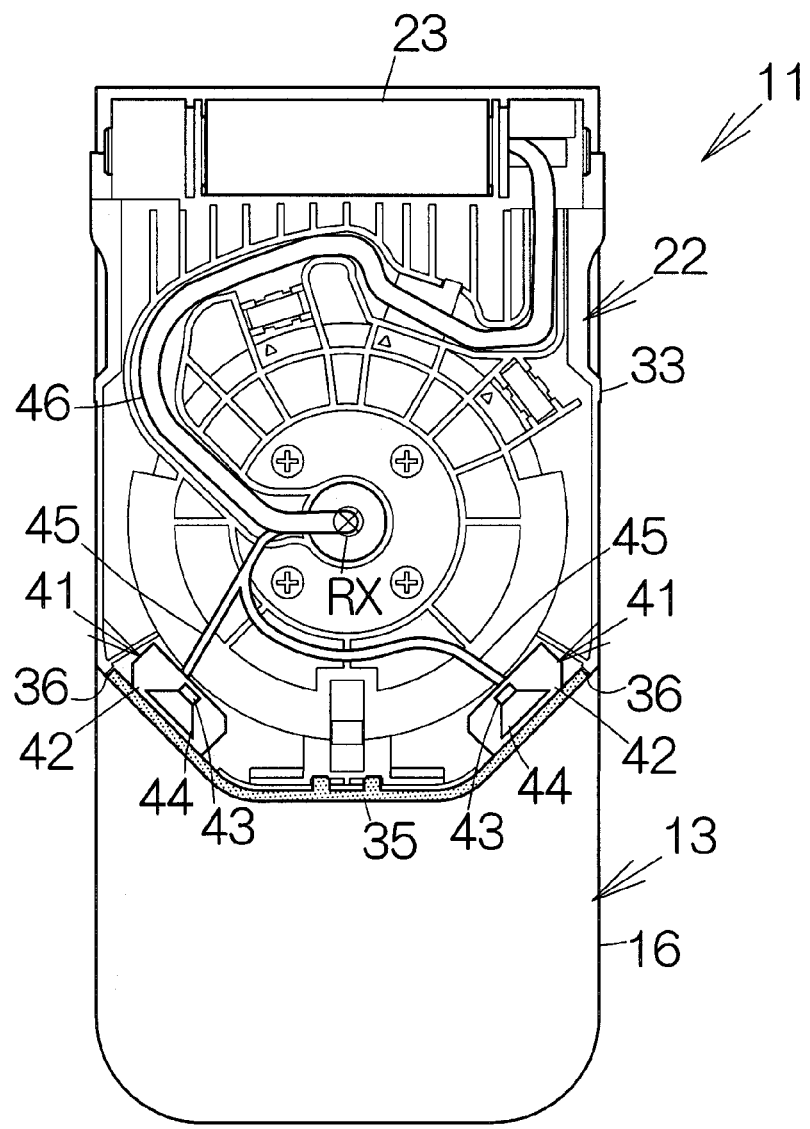
FIG. 6 is a backside view of the mobile phone terminal for schematically illustrating the backside of the bracket body.

FIG. 6 illustrates the back surface of the bracket body 33. A pair of light source units 41 is placed on the back surface of the bracket body 33. The light source units 41 are opposed to the openings 36, respectively. The light source units 41 and the openings 36 are respectively arranged on imaginary circles concentric with the second rotation axis RX at an interval of the central angle of 90 degrees, for example. Each light source unit 41 includes a printed wiring board 42. A light source, namely a light-emitting diode (LED) 43, is mounted on the printed wiring board 42. A light diffusing member 44 is placed in front of each LED 43. The light diffusing member 44 is designed to uniformly diffuse light output from the LED 43 toward the opening 36.

One ends of wires 45 are connected to the printed wiring boards 42, respectively. The wires 45 are bundled to a connecting wire 46 extending through the hinge bracket 22. The connecting wire 46 extends through an inner space defined in the hollow cylindrical shaft 26. The connecting wire 46 is thus connected to a printed wiring board, not shown, placed in the display enclosure 16. The connecting wire 46 also extends through a hollow space in the hinge 23 along the longitudinal axis of the hinge 23. The connecting wire 46 is thus connected to a printed wiring board, not shown, in the main body enclosure 14. Electric power is supplied from the printed wiring board in the main body enclosure 14 to the printed wiring board in the display enclosure 16 through the connecting wire 46. The wires 45 may be connected to either the printed wiring board in the main body enclosure 14 or the printed wiring board in the display enclosure 16. Electric current is supplied to the printed wiring boards 42 or LEDs 43 through the wires 45.

Figure 7:
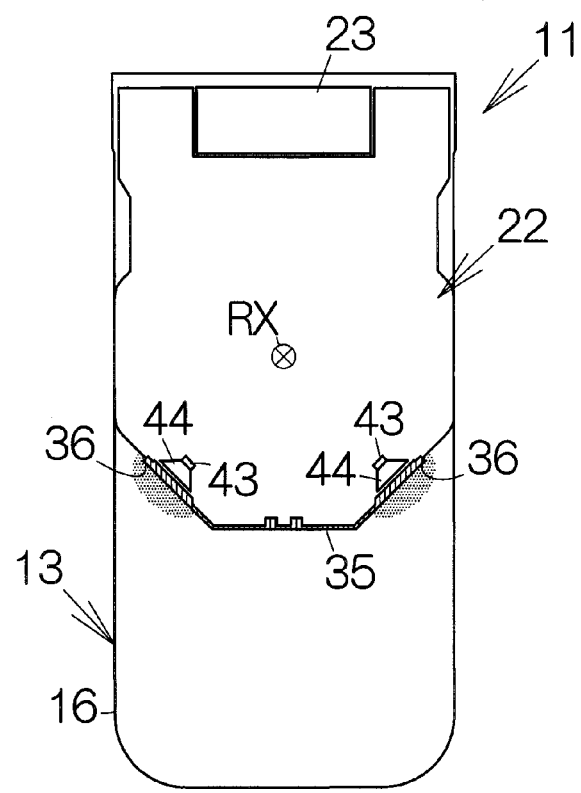
FIG. 7 is a front view of the mobile phone terminal in the closed attitude for schematically illustrating light leaking out of openings.
Figure 8:
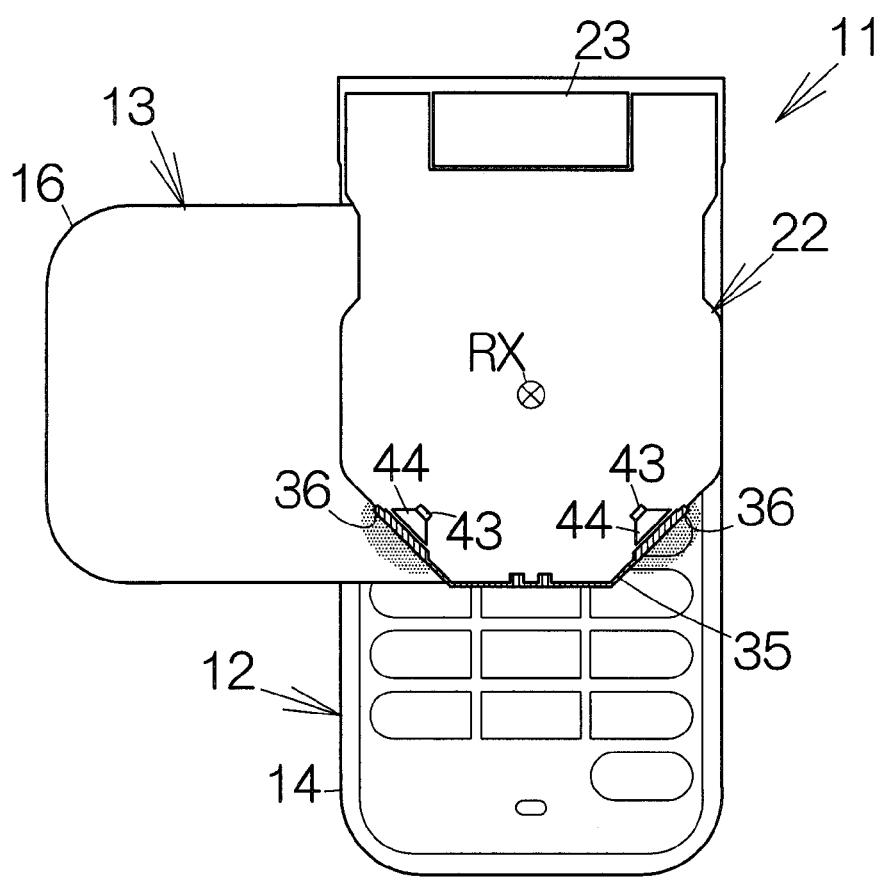
FIG. 8 is a front view of the mobile phone terminal in the closed attitude for schematically illustrating light leaking out of the openings when the display enclosure takes the second pivotal attitude.

As shown in FIG. 7, light leaks from the openings 36 toward the back surface of the display enclosure 16 in the mobile phone terminal 11 in the closed attitude, for example. When the display enclosure 16 rotates relative to the hinge bracket 22 around the second rotation axis RX, the display enclosure 16 takes the second pivotal attitude, as shown in FIG. 8. The hinge bracket 22 is prevented from rotating. The position of the light is maintained regardless of a change in the attitude of the display enclosure 16 around the second rotation axis RX. An effective illumination can be realized. The mobile phone terminal 11 is allowed to enjoy an enhanced appearance.

Figure 9:
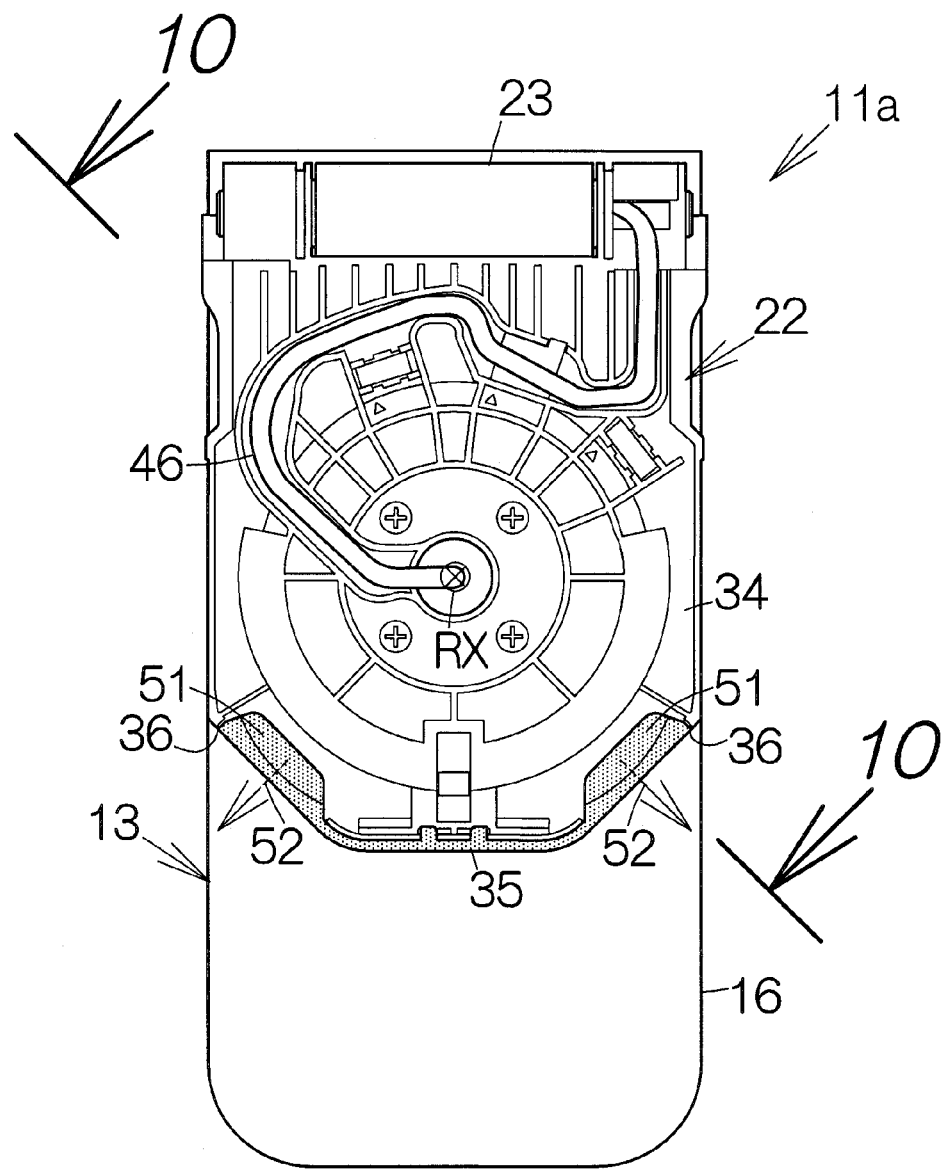
FIG. 9 is a backside view schematically illustrating an electronic apparatus according to a second embodiment of the present invention.
Figure 10:
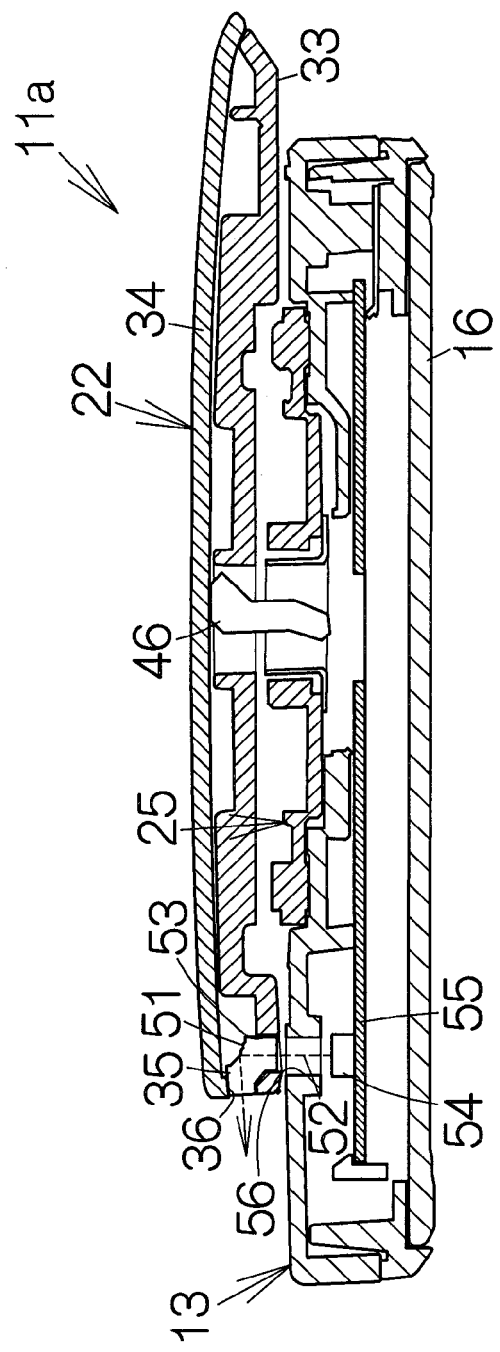
FIG. 10 is a sectional view taken along the line 10-10 in FIG. 9.

FIG. 9 schematically illustrates a mobile phone terminal 11a according to a second embodiment of the present invention. The mobile phone terminal 11a includes reflecting surfaces 51 coupled to the cover 35. The light source units 41 of the first embodiment are omitted from the back surface of the bracket body 33. A predetermined optical path 52 is formed in the cover 35 for establishment of the reflecting surfaces 51. As shown in FIG. 10, the optical path 52 is designed to extend to the opening 36 from an opening 53 opposed to the back surface of the display enclosure 16. The reflecting surface 51 is jagged.

Light sources, namely LEDs 54, are incorporated in the display enclosure 16. The LEDs 54 are mounted on a printed wiring board 55 incorporated in the display enclosure 16. Electric current is supplied to the printed wiring board 55 through the aforementioned connecting wire 46. An opening 56 is formed in the display enclosure 16 at a position on the optical path of the LED 54. The opening 56 is opposed to the opening 53 of the hinge bracket 22.

Light output from the LED 54 passes through the opening 56 into the cover 35. The light is reflected on the reflecting surface 51. Since the reflecting surface 51 is jagged, the light is diffused upon reflection. The diffused light is directed to the opening 36. The light is thus allowed to pass through the opening 36 over a wider range. The light leaks outside the mobile phone terminal 11a through the opening 36.

Figure 11:
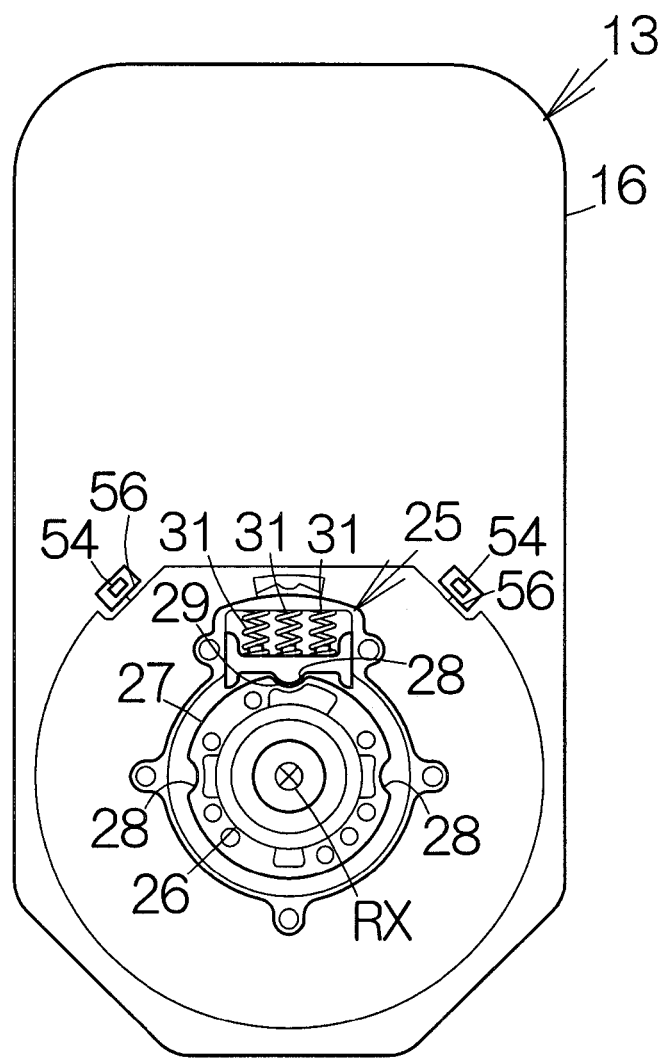
FIG. 11 is a backside view of the display enclosure schematically illustrating the position of light sources.

Here, as shown in FIG. 11, for example, two LEDs 54 are utilized. The LEDs 54 are arranged on an imaginary circle concentric with the second rotation axis RX at an interval of the central angle of 90 degrees, for example. The positions of the openings 53, 56 are determined depending on the positions of the LEDs 54. Like reference numerals are attached to the structure and components equivalent to those of the aforementioned mobile phone terminal 11. It should be noted that the main body enclosure 12, the display enclosure 14, the hinge bracket 22, the cover 35 and the LEDs 54 in combination establish an enclosure assembly for an electronic apparatus according to the present invention.

Figure 12:
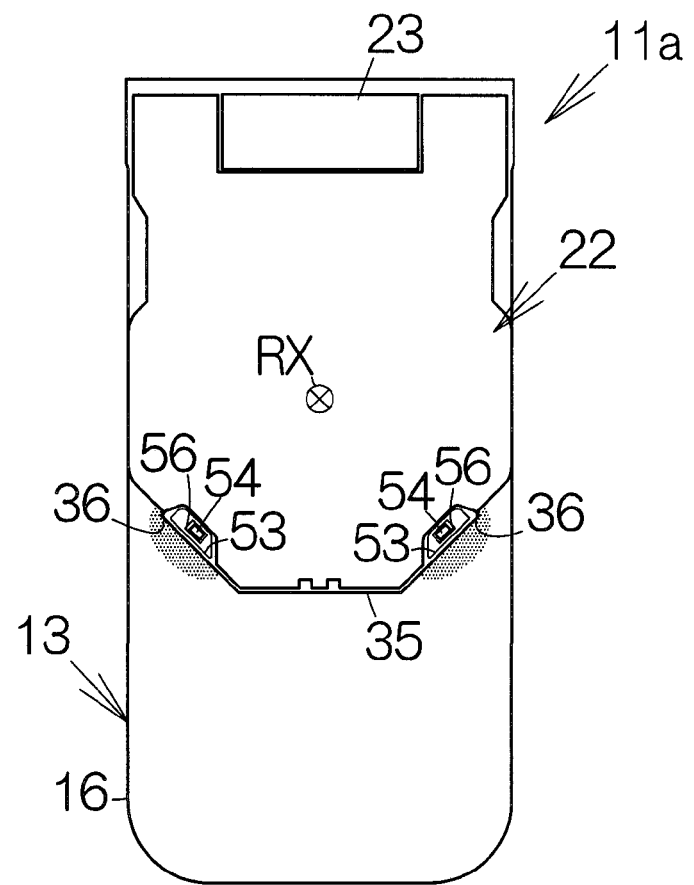
FIG. 12 is a front view of the mobile phone terminal in the closed attitude for schematically illustrating light leaking out of the openings.
Figure 13:
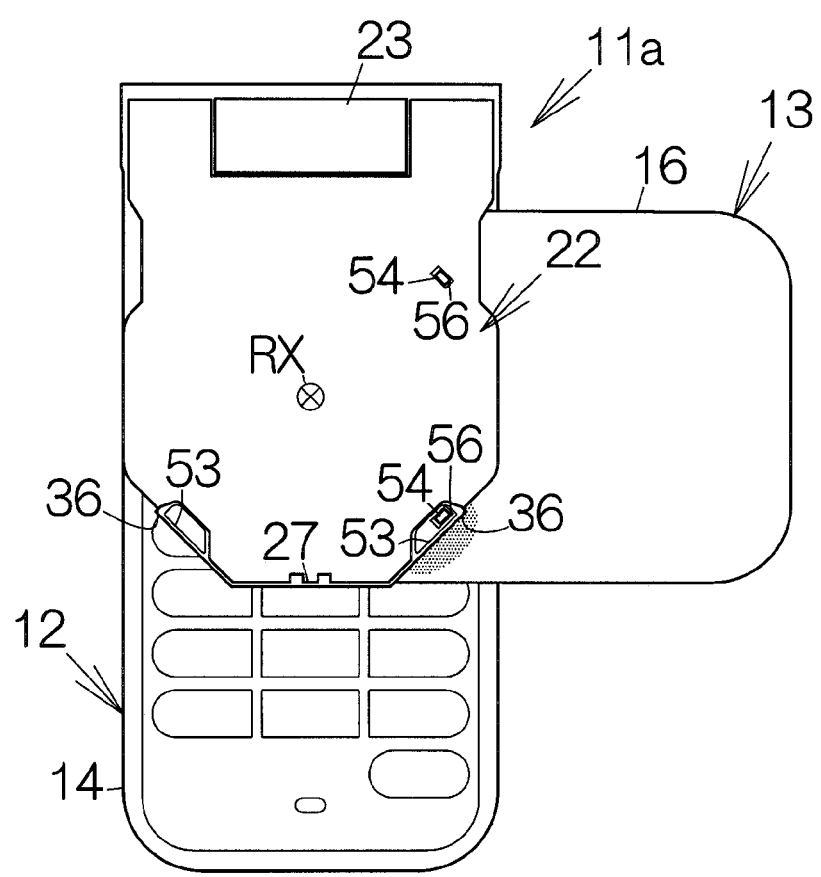
FIG. 13 is a front view of the mobile phone terminal for schematically illustrating light leaking out of the opening when the display enclosure takes the first pivotal attitude.

As shown in FIG. 12, the mobile phone terminal 11a of the closed attitude allows leakage of the light from the openings 36 toward the back surface of the display enclosure 16. When the display enclosure 16 rotates relative to the hinge bracket 22 around the second rotation axis RX, the LEDs 54 shift around the second rotation axis RX. One of the LEDs 54 is positioned off the opening 53. The other LED 54 is moved from one of the openings 53 to the other opening 53. The light thus leaks only from the other opening 53 or opening 36, as shown in FIG. 13. The position of the light is maintained regardless of a change in the attitude of the display enclosure 16 around the second rotation axis RX. An effective illumination can be realized. The mobile phone terminal 11a is allowed to enjoy an enhanced appearance.

Figure 14:
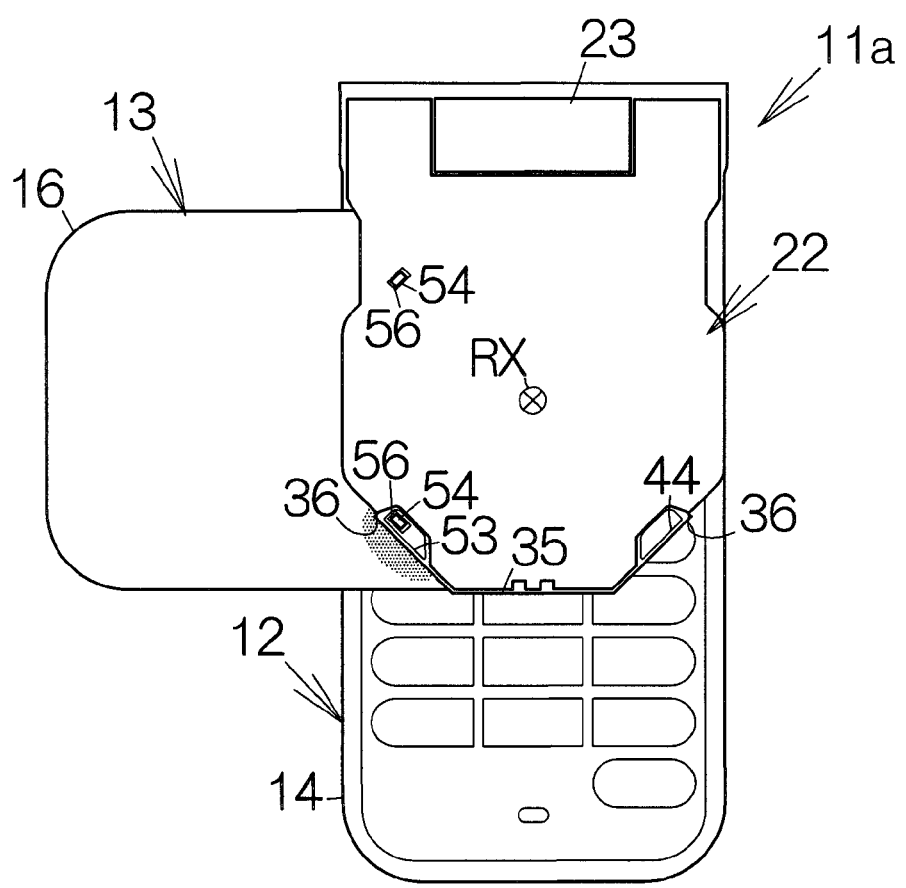
FIG. 14 is a front view of the mobile phone terminal for schematically illustrating light leaking out of the opening when the display enclosure takes the second pivotal attitude.

As shown in FIG. 14, when the display enclosure 16 takes the second pivotal attitude, the light leaks only from one of the openings 53 or openings 36 in the same manner as described above. The position of the light is maintained regardless of change in the attitude of the display enclosure 16 around the second rotation axis RX. An effective illumination can be realized. The mobile phone terminal 11a is allowed to enjoy an enhanced appearance.

The cover 35 enables establishment of the optical path 52 extending from the opening 53 to the opening 36 in the mobile phone terminal 11a. The LEDs 54 are only disposed on the display enclosure 16 at positions respectively opposed to the openings 53. It is unnecessary to place the LEDs 54 on the hinge bracket 22. No space is required for the LEDs 54 in the hinge bracket 22. The hinge bracket 22 is thus allowed to enjoy an effective utilization of a space within the hinge bracket 22. In addition, the hinge bracket 22 is also allowed to enjoy a wide variety of design.

Figure 15:
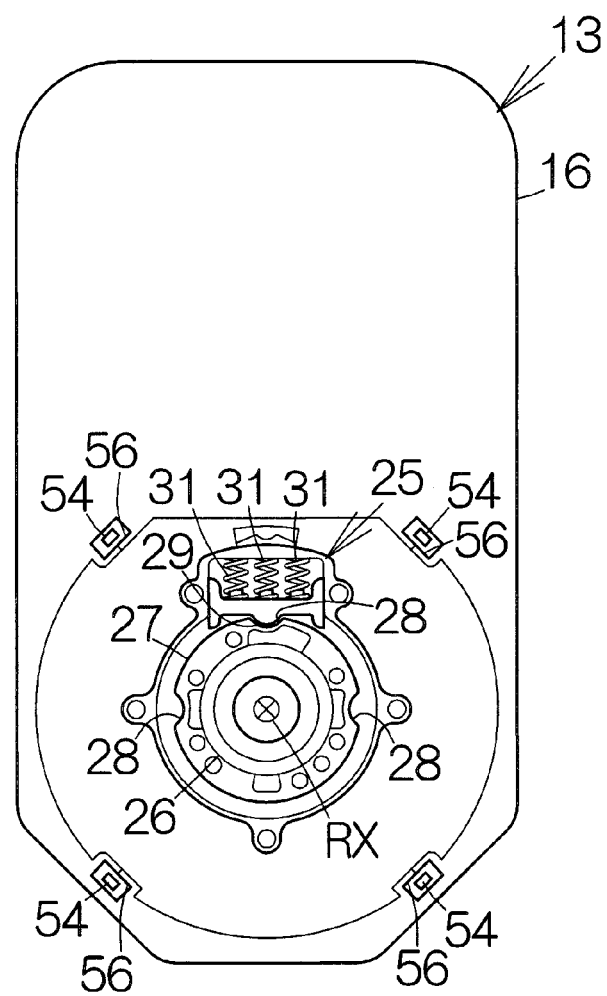
FIG. 15 is a backside view of the display enclosure schematically illustrating the position of light sources.

As shown in FIG. 15, for example, the mobile phone terminal 11a is allowed to include four LEDs 54 arranged on an imaginary circle concentric with the second rotation axis RX at constant intervals of the central angle of 90 degrees. Light can thus leak from both the openings 53 or both the openings 36 toward the display enclosure 16 not only in the first pivotal attitude but also in the second pivotal attitude. The position of the light is maintained regardless of a change in the attitude of the display enclosure 16 around the second rotation axis RX. An effective illumination can be realized. The mobile phone terminal 11a is thus allowed to enjoy an enhanced appearance.

Figure 16:
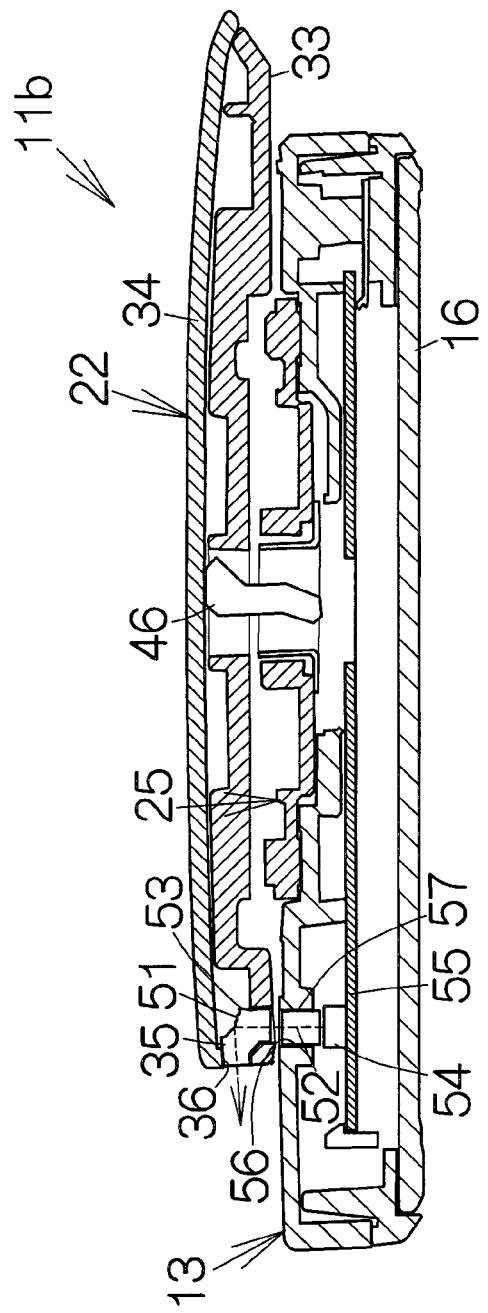
FIG. 16 is a sectional view, corresponding to FIG. 10, schematically illustrating an electronic apparatus according to a third embodiment of the present invention.
Figure 17:
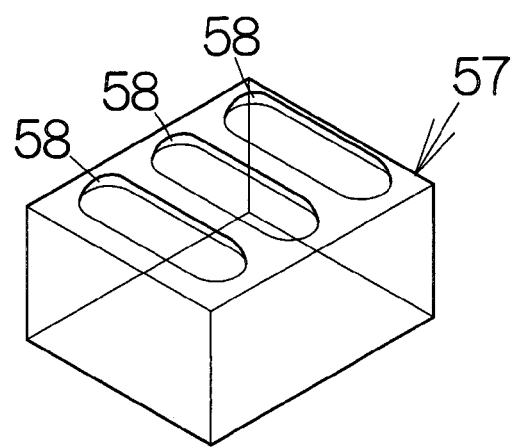
FIG. 17 is a perspective view schematically illustrating a light diffusing member.

FIG. 16 schematically illustrates a mobile phone terminal 11b according to a third embodiment of the present invention. A light diffusing member 57 is placed on the optical path 52 of the LED 54 in the mobile phone terminal 11b. The light diffusing member 57 may be fitted in the opening 56 of the display enclosure 16. As shown in FIG. 17, the light diffusing member 57 includes stripes of swells 58 on the end surface of the light diffusing member 57 opposed to the LED 54. The swells 58 may extend along imaginary parallel lines. Like reference numerals are attached to the structure and components equivalent to those of the aforementioned mobile phone terminal 11a.

The light diffusing member 57 enables a uniform diffusion of light output from the LED 54 to the cover 35 based on the stripes of swells 57 in the mobile phone terminal 11b. The light can thus leak outside the mobile phone terminal 11b through the opening 36 with an enhanced uniformity. The mobile phone terminal 11b is thus allowed to enjoy a further enhanced appearance. In addition, the light diffusing members 57 are respectively fitted in the corresponding openings 56 of the display enclosure 16. The display enclosure 16 is thus prevented from receiving dust and the like through the openings 56.

The electronic apparatus according to the present invention includes, in addition to the mobile phone terminals 11, 11a, 11b, an electronic apparatus such as a personal digital assistant (PDA), a notebook personal computer, and the like.

What is claimed is:

1. An enclosure assembly for an electronic apparatus, comprising:
   a first enclosure;
   a hinge bracket coupled to the first enclosure for relative rotation around a first rotation axis parallel to a front surface of the first enclosure;
   a second enclosure having a back surface superposed on a front surface of the hinge bracket, the second enclosure coupled to the hinge bracket for relative rotation around a second rotation axis extending within an imaginary plane perpendicular to the first rotation axis;
   an optical path defined in the hinge bracket, the optical path extending from a first opening opposed to the back surface of the second enclosure to a second opening defined in a side wall standing upright from the back surface of the second enclosure; and
   a light source placed on the second enclosure at a position opposed to the first opening.

2. The enclosure assembly according to claim 1, further comprising a reflecting surface placed in the optical path to reflect light from the first opening to the second opening.

3. The enclosure assembly according to claim 2, wherein the reflecting surface is jagged.

4. The enclosure assembly according to claim 1, further comprising a light diffusing member fixed to the second enclosure at a position on the optical path of the light source, the light diffusing member including stripes of swell on a surface of the light diffusing member.

5. The enclosure assembly according to claim 1, wherein the light source includes source elements arranged on an imaginary circle concentric with the second rotation axis.

6. The enclosure assembly according to claim 1, wherein a plurality of the first openings is arranged on an imaginary circle concentric with the second rotation axis.

7. The enclosure assembly according to claim 1, wherein the light source includes source elements arranged on an imaginary circle concentric with the second rotation axis at constant intervals, a plurality of the first openings is arranged on an imaginary circle concentric with the second rotation axis at constant intervals.

8. An electronic apparatus comprising:
   a first enclosure;
   a hinge bracket coupled to the first enclosure for relative rotation around a first rotation axis parallel to a front surface of the first enclosure;
   a second enclosure having a back surface superposed on a front surface of the hinge bracket, the second enclosure coupled to the hinge bracket for relative rotation around a second rotation axis extending within an imaginary plane perpendicular to the first rotation axis;
   an optical path defined in the hinge bracket, the optical path extending from a first opening opposed to the back surface of the second enclosure to a second opening defined in a side wall standing upright from the back surface of the second enclosure; and
   a light source placed on the second enclosure at a position opposed to the first opening.

9. The electronic apparatus according to claim 8, further comprising a reflecting surface placed in the optical path to reflect light from the first opening to the second opening.

10. The electronic apparatus according to claim 9, the reflecting surface is jagged.

11. The electronic apparatus according to claim 8, further comprising a light diffusing member fixed to the second enclosure at a position on the optical path of the light source, the light diffusing member including stripes of swell on a surface of the light diffusing member.

12. The electronic apparatus according to claim 8, wherein the light source includes source elements arranged on an imaginary circle concentric with the second rotation axis.

13. The electronic apparatus according to claim 8, wherein a plurality of the first openings is arranged on an imaginary circle concentric with the second rotation axis.

14. The electronic apparatus according to claim 8, wherein the light sources includes source elements arranged on an imaginary circle concentric with the second rotation axis at constant intervals, a plurality of the first openings is arranged on an imaginary circle concentric with the second rotation axis at constant intervals.

* * * * *